UNITED STATES PATENT OFFICE.

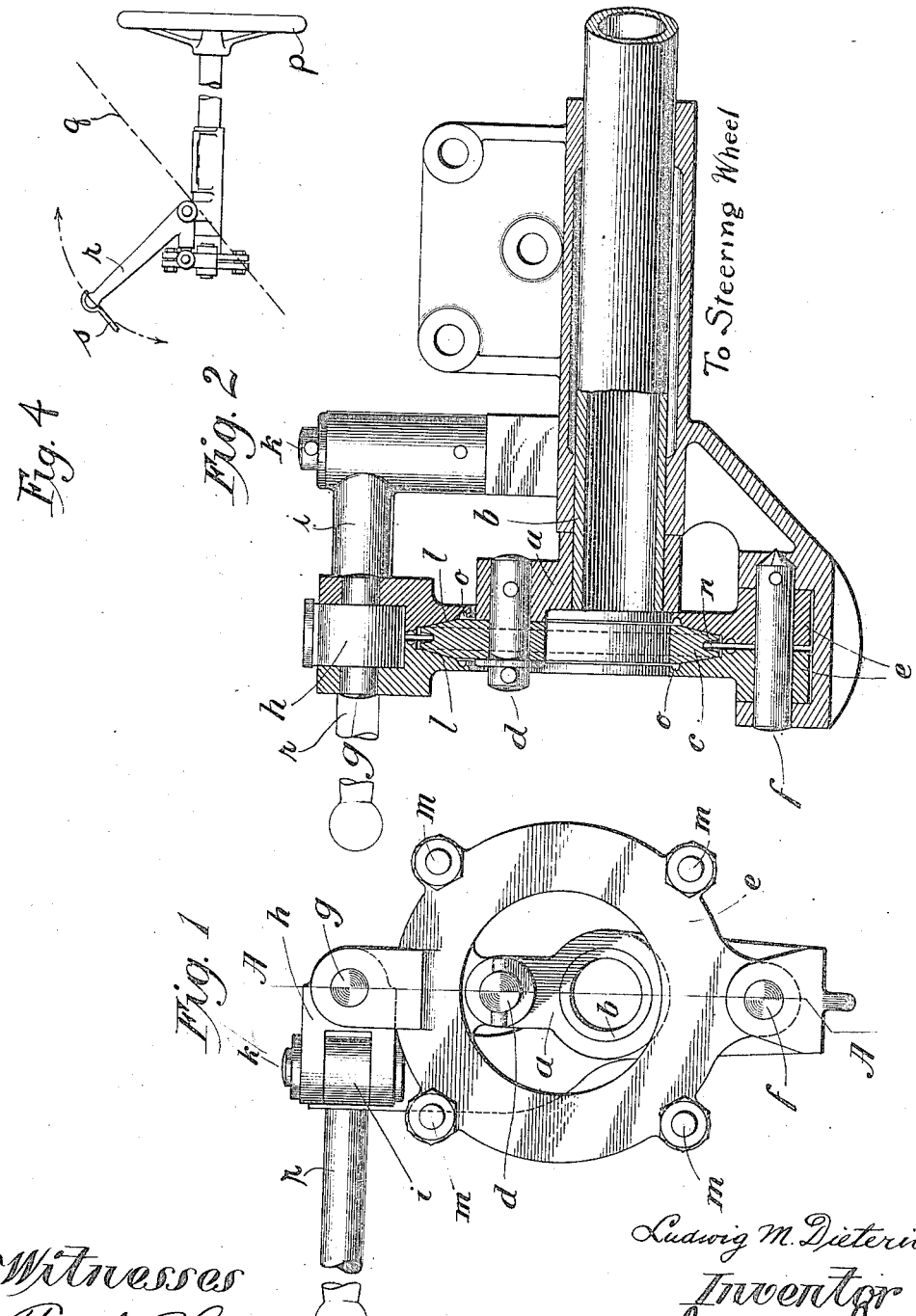

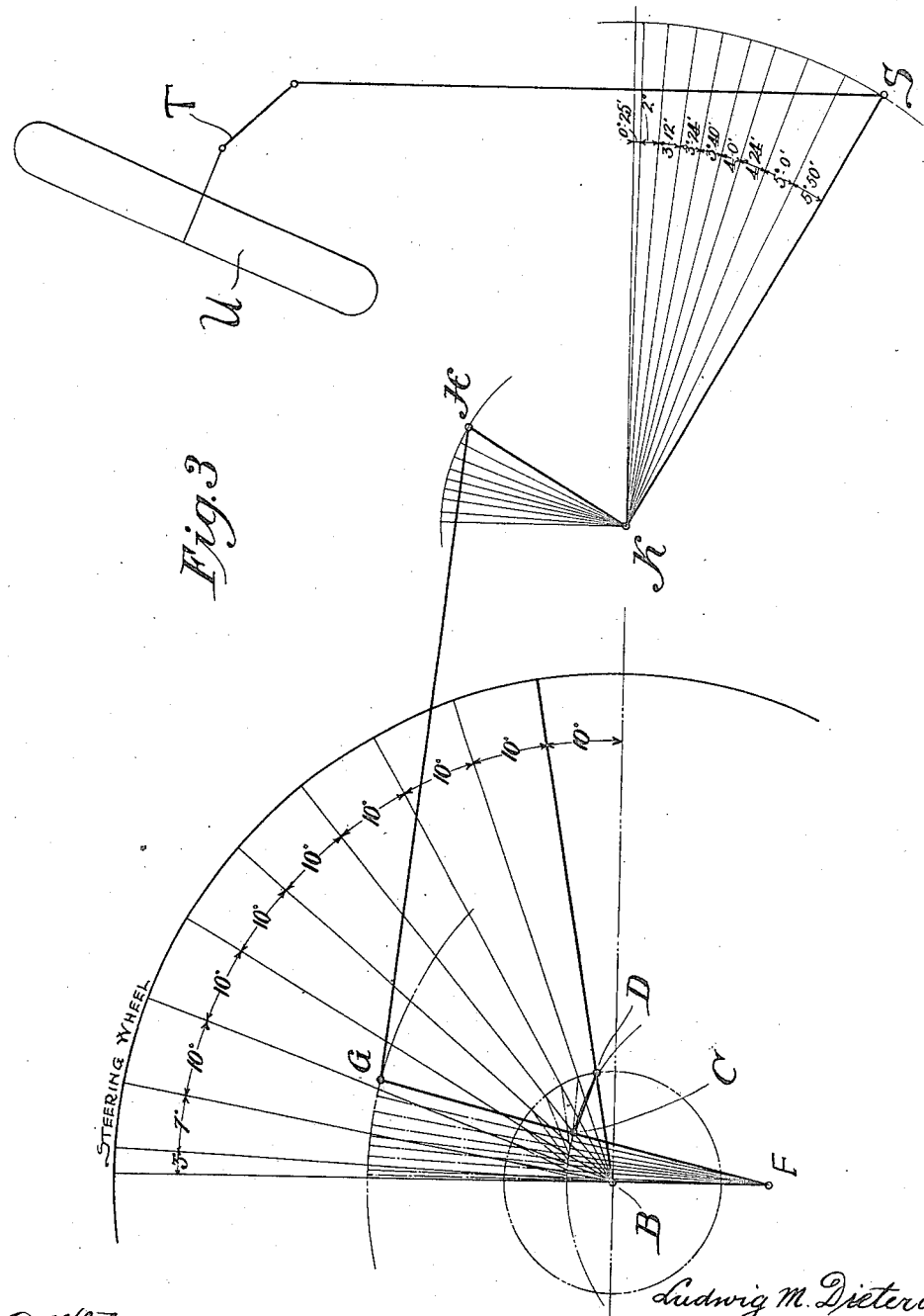

LUDWIG M. DIETERICH, OF MOUNT VERNON, NEW YORK, ASSIGNOR OF ONE-HALF TO HENRY H. WESTINGHOUSE, OF NEW YORK, N. Y.

STEERING-GEAR FOR AUTOMOBILES AND OTHER VEHICLES.

1,232,775.     Specification of Letters Patent.     Patented July 10, 1917.

Application filed November 19, 1914. Serial No. 872,907.

*To all whom it may concern:*

Be it known that I, LUDWIG M. DIETERICH, a citizen of the United States of America, residing at Mt. Vernon, county of Westchester, State of New York, have invented certain new and useful Improvements in Steering-Gears for Automobiles and other Vehicles, and declare the following to be a full, clear, and exact description of the same, such as will enable others skilled in the art to which it pertains to make and use the same, reference being had to the accompanying drawings, which form part of this specification.

This invention relates to hand steering gears, especially for use on automobiles and the object of it is to eliminate certain defects of steering gears designed according to present standards and also to embody characteristics of operation, so far not employed.

At present, steering gears are intended to be irreversible, and the mechanical principle used to obtain this result is usually based on the principle of a screw or worm drive. If carefully designed and manufactured, these steering gears work reasonably well, but have, among others, two characteristics that are open for criticism: First, they are expensive, and second, means for taking up the wear and to prevent excessive back lash are either unsatisfactory or very expensive.

The necessity for rigidly housing this mechanism and also the means for taking up the thrust, further increase the complication, expense and the most serious danger of possible sudden sticking or jamming of this mechanism, while the car is in motion.

The employment of worm or screw and nut principles also calls for a great reduction between the angular movement of the steering wheel and that of the steering arm to maintain a greater or less degree of irreversibility. This great reduction is very desirable, however, when going at high speed on a straight road, as it prevents sudden deviations from the direction of running by small movements of the steering wheel, which sometimes cannot be prevented by reason of the vibration of the car or involuntary movements of the hands of the operator. When going around a curve, however, in which instance the car speed is usually smaller, this big reduction is not only not necessary, but in cases of emergency when a quick turn should be taken, directly objectionable, as it takes about from 1¼ to 1¾ turns of the steering wheel to obtain the full throw of the front wheels.

This means nearly every time the objectionable necessity of a rapid change of position of the hands on the steering rim. I have found it to be the best solution of steering gear reduction to have a very high reduction when going straight and to gradually decrease this reduction when turning a corner. Such an arrangement would give the possibility of "fine" steering at high speed and of getting the full range of the steering angle of the wheels with a comparatively small angle of the steering wheel.

That a small reduction is practical is best illustrated by the use of tiller steering on electric pleasure cars, where an angle of 90 degrees on the tiller effects the full throw of the running wheels. Taking into consideration the increased leverage on the tiller as against a steering wheel, which is about four times as great, and also taking into consideration that the tiller is operated by one hand, the steering wheel, however, by both hands, we find that double the reduction of a direct tiller steering would be sufficient for wheel steering, as far as ease of operation is concerned and for cars up to about 2750 lbs. weight and a maximum speed of about twenty miles per hour.

If we can now obtain such a low reduction at the point of full throw to one or the other side, and increase this reduction with a decrease of steering angle and maintain a higher reduction for straight running than we have even now, it will be seen that such a steering mechanism would permit finer, safer, and if necessary, quicker steering than at present possible with standard steering columns.

Certain of the objects of my invention are to improve the above apparatus along the above lines and other objects will be obvious.

In the attached drawings—

Figure 1 is a bottom plan view of the steering mechanism, and

Fig. 2 a drawing partially in section of the same, according to line A A.

Fig. 3 is a diagrammatical drawing showing the relation of angular motion of steering wheel and steering knuckle.

Fig. 4 is a diagrammatic side elevation of certain of the parts.

Considering the construction of the steering column in itself, and related parts, we find in Figs. 1 and 2 that it consists of an arm $a$ fastened to the steering tube $b$ and pivotally engaging at $d$ an eccentric $c$ which engages with its beveled surface $l$ an eccentric housing $e$ pivoted at $f$ and connected at $g$ by a double yoke piece $h$ with the steering arm $i$ pivoted at $k$.

A characteristic of this construction is that the well-known operation of an eccentric, to be effective as a driver for its housing and less effective when driven from its housing, is enhanced by the beveling of the contact surfaces $l$ between eccentric and eccentric housing. At about an angle of 25 degrees, steel to steel, the eccentric can be easily rotated and impart motion to the eccentric housing, but when the housing tries to oscillate around its fulcrum $f$, an immediate locking between the eccentric housing and the eccentric takes place, thereby establishing absolute irreversibility.

By increasing the angle of contact surfaces between the eccentric and its housing, this steering device can be made partially irreversible to any desired degree, which angle depends entirely upon the coefficient of friction between eccentric and eccentric housing material.
As shown in the attached drawing, the steering arm $i$ swings parallel with the steering tube, but any other angle can be obtained by properly changing the angle between the axis of the steering arm and that of the steering column, as the connecting link between the bell crank steering arm $i$ and eccentric housing $e$ permits of universal motion.

Looking at Fig. 2, it will be seen that only a supporting frame is needed for the rigid placing of the steering column and that there is no necessity for an oil-tight housing, as at present used in standard construction, which is quite expensive.
All the moving parts are simple lever joints, as we find exposed in different parts of an automobile. The only exception is the eccentric and its housing, which should be dust proof and lubricated. It will be seen that the housing consists of two similar parts and the adjustment between the housing and the eccentric is taken care of by four bolts $m$. The space between two halves of the housing is filled by a felt ring, not shown, allowing of adjustment, excluding dust, and preventing the lubricating means from escape. As lubricating means, a graphite grease is used, which is packed into the circular groove $n$ of the eccentric. A circular dust groove $o$ in each half of the housing, as effectually used with ball bearings, protects the beveled surfaces from the entrance of dust and grit on these points.

A better understanding of the relation of certain parts of this apparatus is gained from Fig. 4 of the drawings in which the steering column $b$ is shown as provided with the steering wheel $p$, this view being a side elevation taken from the left hand side of an automobile floor, the line of which is diagrammatically indicated at $q$. In this figure the wheel, and consequently the lever or steering arm $i$, are shown in their normal position with the vehicle running straight ahead, and it will be noted that with the steering column inclined with respect to the floor the arm $i$ is provided with a lever extension $r$ at an acute angle therewith. To the end of lever arm $r$ is connected link $s$ leading to the steering knuckles or stub axles of the vehicle wheels. By this arrangement, whichever way the steering wheel be turned from its normal position, the effect upon the link $s$ is equal with an equal degree of turning of the steering wheel. In other words, if the steering wheel be turned a given angle, say fifteen degrees, in a right hand direction it will cause a movement of translation of the link $s$ throughout a distance which is equal in length but opposite in direction from that which would be given if the steering wheel were turned throughout fifteen degrees of left hand rotation.

In the attached drawings, Fig. 3 shows that an angle of 80 degrees on the steering wheel will permit the full throw of the steering wheels on the car to one side.

At full throw, the reduction is shown to be about one to two, being about the same as in the above-mentioned tiller steering method.

The smaller the deflection of the steering wheels of a car from their straight ahead position becomes, the greater becomes the reduction as shown in Fig. 3, and when the car is running straight, the reduction is actually infinitely great.

This means that going at high speed on a comparatively straight course, it takes a comparatively big angle on the steering wheel of the steering column for a small deflection of the steering wheels of the cars, which fact constitutes the characteristics of "fine" steering, so very desirable on high speed cars.
Summing up briefly the operation of this apparatus, it may be noted that as the wheel $p$ is turned it swings the eccentric $c$, which, by the action above described, oscillates the eccentric housing $e$ about the pivot $f$ and through the connection described swings the bell crank lever, comprising the arms $i$ and $r$; the latter in turn moves the link $s$ to swing the wheels of the vehicle. As above described, the steering effect is equal whichever direction from normal position the steering wheel is swung, although steering effect, or angular swinging of the vehicle wheels, increases at an increasing rate accordingly as the steering wheel departs from its normal straight ahead position.

As far as the manufacturing operations are concerned, it will be seen that they consist only of drilling and plain turning.

The simplicity and light weight of this steering mechanism permits of one standard design or stock type for a great variety of car weights, and the angular position of the steering column can be taken care of by a special angle plate interposed between the steering column and the frame.

The ratio of reduction can be chosen at will as can be easily seen in Fig. 3, by simply changing the proportion of the distances of the different link centers, according to the desired end in view.

Fig. 3 shows diagrammatically the manner of operation of the above described steering mechanism and shows more clearly the change in the ratio of reduction. At B is indicated the center of the steering tube $b$, and at D is the center of the pivot $d$ at the extremity of the arm $a$ mounted on the steering tube $b$. The eccentric housing or link $e$ is represented by the line GF and is pivoted at F. As the steering wheel is turned, the locus of the point B will be the circle passing through point D with B as its center, and the locus of the center of the eccentric $c$ will be the arc passing through the point C as shown in Fig. 3. For equal displacements from normal of the steering tube $b$, and hence of the arm $a$, as for example, displacements of ten degrees as shown in Fig. 3, the point G which represents the extremity of the housing $e$ pivoted at F, is displaced in progressively increasing amounts. This is shown by the successive positions spaced off on the arc passing through point G. The successively increasing displacements of the point G are communicated to the point H which represents one extremity of the bell crank lever HKS in Fig. 3 and shown also in Fig. 4 at $r$. Bell crank lever HKS in Fig. 3, by a suitable proportioning of the lengths of its arms, serves to multiply or increase the displacements of the point H, and the successive positions of the arm KS show the progressively increasing displacements corresponding to the uniform and equal displacements of the steering tube $b$. Hence the increasing ratio of reduction is shown graphically by the increasing displacements of the point S. The vehicle wheel U is shown diagrammatically, connected to the bell crank lever HKS by means of suitable linkages and serves only to indicate how the successively increasing displacements of the steering mechanism as obtained from the uniform and equal displacements of the steering wheel are communicated to the vehicle wheel.

It will thus be seen that there is provided apparatus in which the several objects of this invention are achieved and which is well adapted to meet the conditions of hard practical use.

As many changes might be made in the above construction, and as many apparently different embodiments might be made of this invention without departing from the scope thereof, it is intended that all features herein described or shown in the accompanying drawings shall be interpreted as illustrative and not in a limiting sense.

What I claim is:—

1. In apparatus of the class described, the combination with a steering shaft, of an eccentric, a link connecting said steering shaft with said eccentric, and an eccentrically pivoted eccentric housing coöperating with said eccentric.

2. A steering mechanism consisting of steering tube or shaft, an arm thereon, pivoted to an eccentric, the center of which is eccentric to the center of the steering tube, a housing in contact with said eccentric and pivoted eccentrically to the centers of the steering tube and eccentric.

3. A steering mechanism consisting of steering tube or shaft, an arm thereon pivoted to an eccentric, the center of which is eccentric to the center of the steering tube, a housing in contact with said eccentric and pivoted eccentrically to the centers of the steering tube and eccentric, and connected to the steering knuckles by means of a bell crank lever and a plurality of links.

4. In a steering mechanism of the class described, the combination with an eccentric having beveled surfaces, of a housing having corresponding beveled surfaces to coöperate with said eccentric, said eccentric housing being serially connected between the steering wheel and the vehicle wheel controlled thereby and acting to wedge or lock upon the transmission of power in one direction.

5. In a steering mechanism of this character an eccentric housing, consisting of two parts held together by adjustable connections, an eccentric co-acting with said housing, a steering wheel connected with said eccentric, a pivotally mounted power-transmitting member, connections between said latter member and said housing, and a steering knuckle connected with said power-transmitting member.

6. In a steering gear of the character described, in combination with the steering shaft and the wheel steering knuckles, means including an eccentric connected to said steering shaft by means of a link, whereby an even angular motion of the steering shaft from normal position produces a progressively increasing angular motion of the wheel steering knuckles.

7. In a steering gear of the character described, in combination with the steering shaft and the wheel steering knuckles, means including an arm on said steering shaft, an eccentric pivotally mounted on said arm, and link connections coöperating with said eccentric, whereby an even angular motion of the steering shaft from normal position produces a progressively increasing angular motion of the wheel steering knuckles.

8. In apparatus of the character described, in combination, a steering member, a vehicle wheel and means adapted to steer said wheel from said steering member adapted to transmit power in one direction and to wedge by means of members having beveled surfaces into non-transmitting condition by the action of power transmitted from the vehicle wheel in the direction of the steering member.

9. In apparatus of the character described, in combination, a vehicle wheel, a steering member, a means including an eccentric eccentrically mounted on an arm on said steering member connecting said member with said wheel adapted upon said member being actuated to a predetermined extent in either direction from normal position to impart equal movements to said wheel and adapted to increase the ratio of movement of the wheel to that of the steering member accordingly as the steering member departs from its normal position.

In witness whereof, I hereunto subscribe my name, as attested by the two subscribing witnesses.

LUDWIG M. DIETERICH.

Witnesses:
R. S. BLAIR,
H. J. BRUNJES.

Copies of this patent may be obtained for five cents each, by addressing the "Commissioner of Patents, Washington, D. C."